(12) United States Patent
Heed

(10) Patent No.: US 6,361,471 B1
(45) Date of Patent: Mar. 26, 2002

(54) METHOD FOR COMBUSTION ENGINE CONTROL

(76) Inventor: Björn Heed, Utlandagatan 19, SE-412 61 Göteborg (SE)

( * ) Notice: Subject to any disclaimer, the term of this patent is extended or adjusted under 35 U.S.C. 154(b) by 0 days.

(21) Appl. No.: 09/627,284

(22) Filed: Jul. 28, 2000

Related U.S. Application Data

(63) Continuation-in-part of application No. 09/043,114, filed as application No. PCT/SE96/01304 on Oct. 15, 1996, now abandoned.

(30) Foreign Application Priority Data

Oct. 18, 1995 (SE) ................................................ 9503629

(51) Int. Cl.$^7$ .............................................. B60K 41/12
(52) U.S. Cl. ........................... 477/43; 477/46; 477/121
(58) Field of Search ............................ 477/43, 46, 121

(56) References Cited

U.S. PATENT DOCUMENTS

| | | | | |
|---|---|---|---|---|
| 4,543,855 A | * | 10/1985 | Oetting et al. | |
| 4,627,311 A | * | 12/1986 | Yokooku et al. | 477/43 |
| 4,641,553 A | * | 2/1987 | Kobayashi | |
| 4,686,871 A | * | 8/1987 | Kobayashi | 477/47 |
| 4,760,760 A | * | 8/1988 | Miyawaki | |
| 4,862,771 A | * | 9/1989 | Kumura et al. | |
| 5,007,147 A | * | 4/1991 | Imai et al. | |
| 5,040,114 A | * | 8/1991 | Ishikawa et al. | 477/43 |
| 5,150,635 A | * | 9/1992 | Minowa et al. | 477/43 |
| 5,172,610 A | * | 12/1992 | Uzawa et al. | |
| 5,749,804 A | * | 5/1998 | Toukura | 477/47 |

* cited by examiner

Primary Examiner—Sherry Estremsky
(74) Attorney, Agent, or Firm—Orum & Roth

(57) ABSTRACT

A method for control of internal combustion engine powered vehicles wherein the vehicle driver, during normal vehicle operation, determines the vehicle velocity essential by controlling the gear transmission ratio between vehicle's engine and it's wheels. Thereby the rotational speed of the engine is kept low resulting in high engine energy efficiency during normal operation, while the driver by reflex, immediately and without auxiliary controls is able to shift to high engine speeds and corresponding high engine power.

4 Claims, 2 Drawing Sheets

METHOD FOR COMBUSTION ENGINE CONTROL

This is a Continuation-In-Part of application Ser. No. 09/043,114, filed Apr. 20, 1998 and now abandoned, which claims the benefit of Swedish Application No. 9503629-9, filed Oct. 18, 1995 which is a 371 of PCT/SE96/01304 filed Oct. 15, 1996.

BACKGROUND OF THE INVENTION

Vehicles are often propelled by various types of internal combustion engines where the propulsion force is generated by expansion of hot combustion gases acting on pistons working in cylinders. The pistons in turn drive a crankshaft which is connected to the driving wheels by means of a gear box.

After connection of the crankshaft to the wheels using a suitable transmission ratio or "gear" the velocity of the vehicle is controlled by means of an accelerator influencing the rotational speed (rpm) of the engine. The function of the accelerator is to act as a fuel supply control for the amount of fuel (for instance Diesel engines) or fuel air mixture (for instance gasoline engines) that is supplied to the engine and thus generating various engine torque which in combination with the vehicle's resistance to movement and its inertia determine the resulting engine speed and vehicle velocity. Sometimes the accelerator is connected to a regulator that strives to control the rpm of the engine to a value that corresponds to a set value that depends on the actuation of the accelerator. Most often such active control is not used but the resulting velocity of the vehicle caused by a certain actuation of the accelerator depends on the encountered resistance.

The power of an engine is strongly dependent of its rpm and engine torque is limited. Consequently, there is a need for varying the transmission ratio according to circumstances. For instance a lower transmission ratio is used to obtain enough force to climb a steep hill and high transmission ratios are used at high vehicle velocities to prevent the engine rpm from becoming too high. Every driver develops his/her own style and feeling for when and how to use which gear.

The transmission ratio can also be chosen by the program of a so called automatic gear box without the driver having to make decisions. The final speed of the vehicle is then determined by the position of the accelerator. In case of small actuation of the accelerator, the engine power is not sufficient for the use of a high transmission gear ratio and the automatic gear box chooses a smaller gear ratio. In case of large actuation, the engine power is sufficient also for high gear ratios, and after an acceleration period, the velocity of the vehicle will be high.

The program of automatic gear boxes may then be arranged in different ways so that changes to higher gear ratios take place at different engine rpm's. When changes take place at high engine rpm's close to the maximum engine power, the capacity of the engine is used to its maximum and acceleration can be high. If changes in gear ratio take place at lower engine rpm's, the engine capacity is not fully exploited and acceleration is more gentle. With many automatic gear boxes, it is possible to choose between different programs for the achievement of different degrees of "sports car behavior" of the gear box. In some cases an automatic change to lower gear "so called kick-down" takes place when the accelerator is rapidly actuated.

From energy efficiency and fuel consumption points of view, operation at high engine RPM is decidedly unfavorable. Gas velocities at entrance and exit of the cylinders increase at increased rpm, causing increased flow-losses. Thus, over most of the operational range, for a given power output, the energy efficiency of an internal combustion engine gets better the lower the rpm is. When designing automatic transmission gear boxes, it constitutes a problem to adapt the gear choosing program to obtain both as good engine energy efficiency and as high power from the engine as possible.

SUMMARY OF THE INVENTION

The present invention provides a solution to the conflict between engine power utilization and efficiency for a system with automatic transmission so that the driver can all the time adjust this optimization according to circumstance. At all times the driver automatically chooses between fuel consumption and "sports car" behavior in such a manner that at one moment he may give priority of the one and at the next moment to the other all according to the traffic situation.

The system is most easily described and at its best when operating in connection with a gear box having a continuously variable gear ratio. During normal conditions, already accelerated to cruising speed, the function then is as follows:

The engine control mechanism is set at maximum throttle or fuel supply. This control mechanism then determines neither the engine rpm nor the engine power or the vehicle velocity. Instead these entities are determined indirectly by the driver using a speed controller that regulates the gear box instead of the engine. When the gear ratio is decreased, the engine rpm increases and so does the engine power and the vehicle velocity. When instead the gear ratio is increased, the engine can no longer sustain its rpm, which decreases as does the engine power and the velocity.

Upon acceleration, the gear ratio is decreased, resulting in more engine output. The lower the gear ratio is set, the higher the rpm and the higher the engine power will be, and the more sporty the acceleration up to the maximum power rpm level, which is determined by the individual engine's design characteristics.

DETAILED DESCRIPTION OF THE INVENTION

Figure 1:
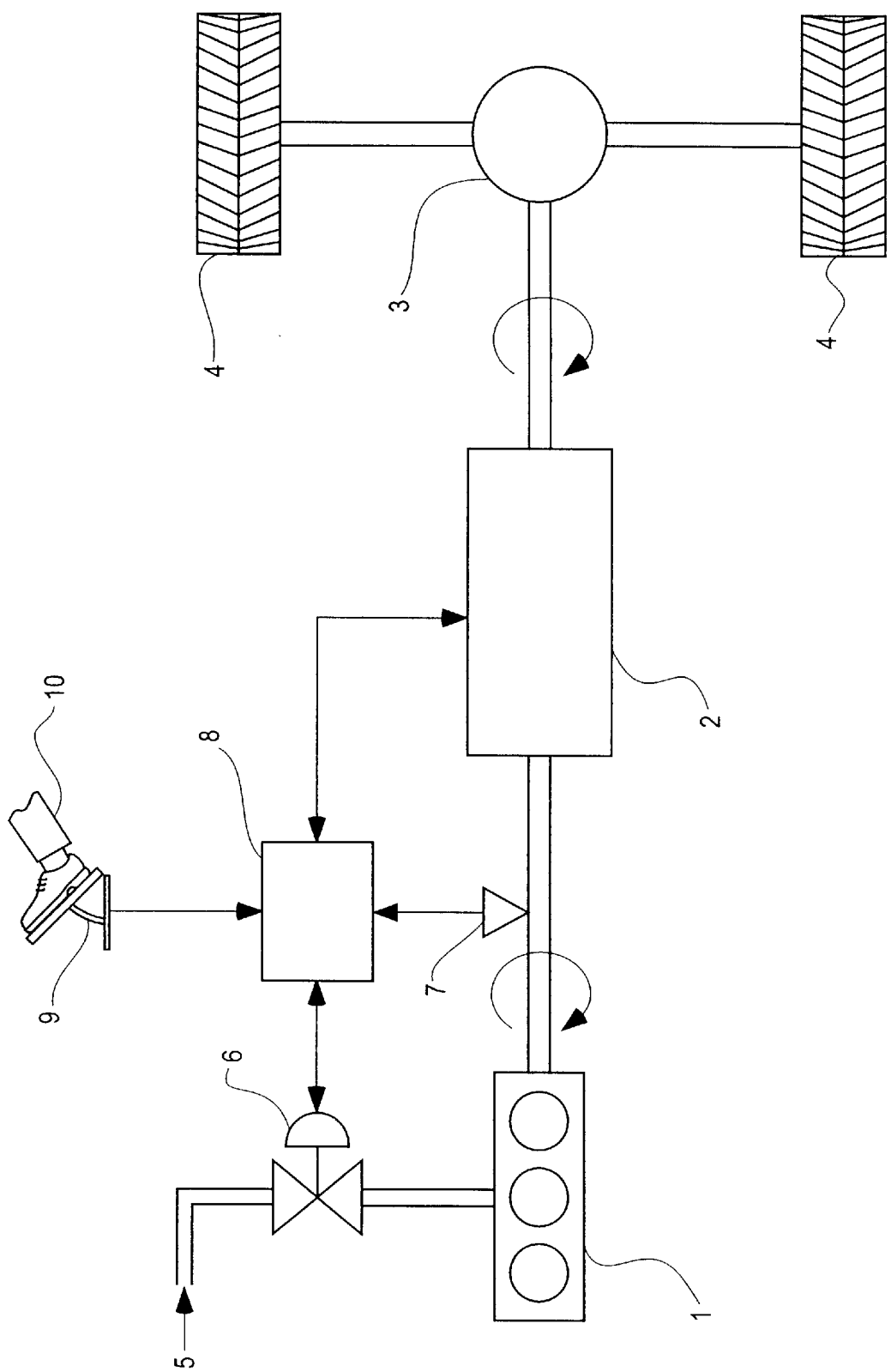
FIG. 1 is a schematic diagram of a vehicle that may be controlled in accordance with the invention.

In FIG. 1, a vehicle has an internal combustion engine 1 and an automatic continuously variable gear ratio transmission 2. The transmission 2 is connected on the input side to the engine 1 and on the output side with the wheels 4 of the vehicle by an axle drive 3. Fuel 5 is delivered to the engine 1. The fuel delivery rate is controlled by a fuel supply control 6, commonly known as a throttle. A control unit 8 receives inputs of the fuel supply control 6 position, the accelerator pedal 9 position, the engine output rpm (read by rpm sensor 7), and the gear ratio reported by the transmission 2. Processing the inputs by the method disclosed hereinafter, the control unit outputs set points for the transmission 2 and fuel supply control 6.

For the driver 10, the experience will not differ very much from when using a conventional automatic gear transmission system. He will still have one controller by means of which he regulates the vehicle velocity. Upon increased actuation of the accelerator 9, the engine rpm increases and the vehicle accelerates to an equilibrium velocity corresponding to the accelerator actuation and the resistance to movement. Upon decreased actuation, the engine rpm and the vehicle velocity are reduced. The difference is however that the rpm of the engine 1 is continuously kept as low as possible for the desired engine power. A higher engine power is obtained at the cost of a lower energy efficiency and a higher fuel consumption. Rapid accelerations use more fuel than slow ones. For the driver the choice between "sporty" and "economic" drive modes is made easy. By means of the speed control he chooses directly from a continuous range between the two extremes without having to think or to use any auxiliary control. The speed control or accelerator of the present invention can advantageously be spring mounted to return to zero if released in the same way as the accelerator in a conventional design.

It is true that a certain actuation of the accelerator does not correspond to a definite velocity but this is likewise normally not the case when controlling the velocity by means of a throttle as is conventionally done. The important thing is that the driver can easily control whether to accelerate, reduce or maintain velocity. With the new system, he can do so while at the same time best RPM and fuel efficiency are achieved automatically.

Figure 3:
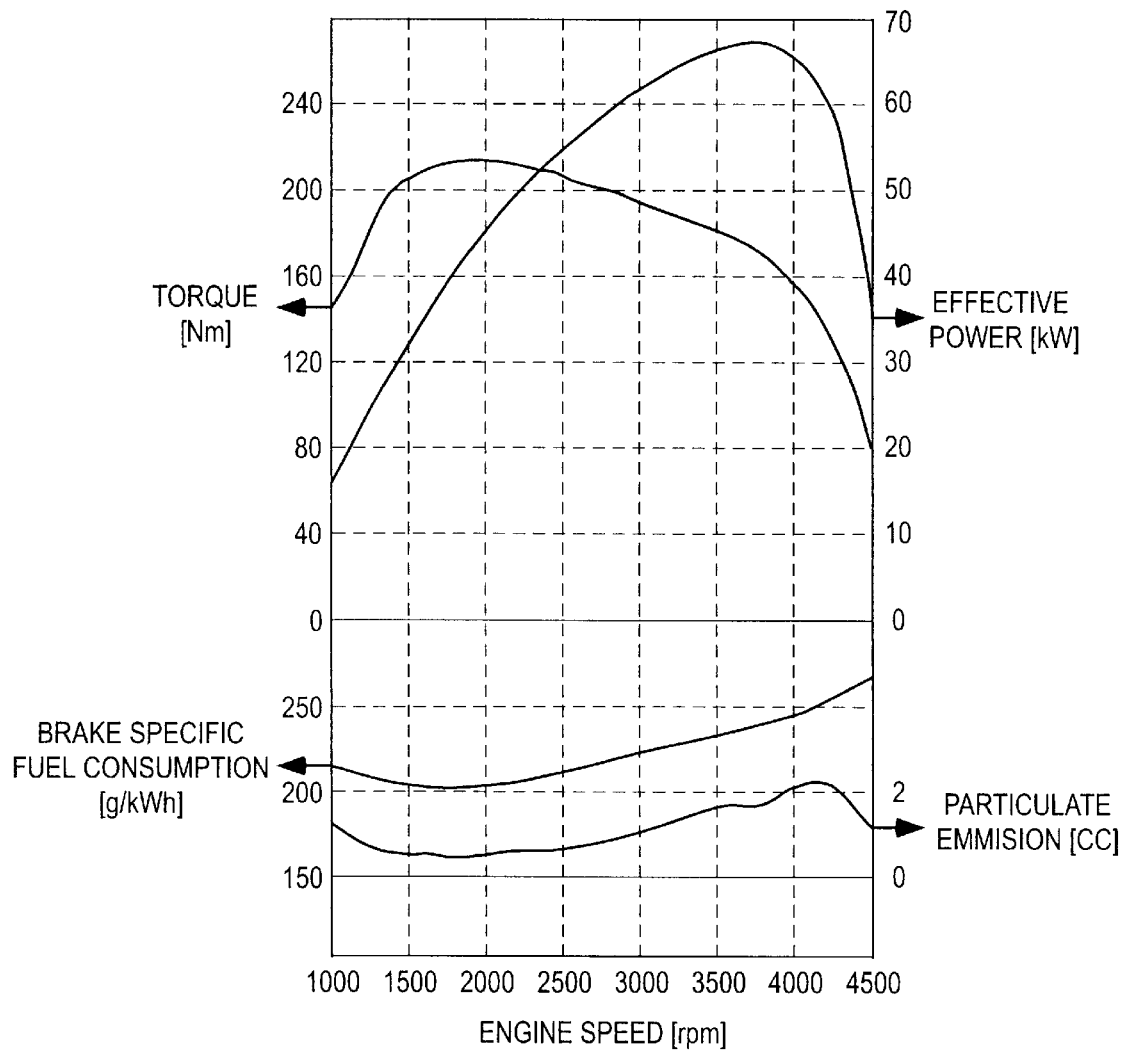
FIG. 3 is a graph of an engine's operating characteristics.

FIG. 3 is an example of a chart identifying a specific engine's operating characteristics. Within the main part of the operation range of internal combustion engines, the power at full throttle or maximum fuel supply increases with increasing RPM. However the energy efficiency decreases, and at very high rpm's the power no longer increases. The point where power no longer increases is known by the engine characteristics and is desired as the predetermined maximum rpm allowed by the control system. In order for the described system to operate well, it is therefore necessary to restrict the transmission gear ratio so that by large actuation of the accelerator, it does not become so low that the rpm of the engine significantly exceeds the rpm where maximum power is achieved. At full actuation of the accelerator from rest or slow velocity conditions, the gear ratio should be reduced only so far as to obtain maximum power from the engine, and then the gear ratio should increase successively to maintain maximum power while the vehicle accelerates. When the vehicle reaches the desired velocity or maximum acceleration is no longer desired, the driver lessens the actuation of the accelerator. The transmission gear ratio then increases more rapidly than the velocity so that the engine rpm and therefore the engine power are reduced to a level that has only enough power to maintain the selected velocity or acceleration level.

To permit efficient operation during low power situations, for example a lightly loaded vehicle traveling downhill with a tailwind, the transmission's gear ratio is higher than in a common, throttle controlled vehicle. This allows full throttle operation at minimal rpm's for low power/high velocities, and thereby maximum efficiency. Similarly, at high power low velocities as when a very heavy load is carried and/or a steep incline is climbed, very low gear ratios are desired. To maximize utility, the overall range of the transmission will be much wider than required for a conventional throttle controlled vehicle. An engine with high torque characteristics at the low rpm range is also very advantageous.

Internal combustion engines do not run well at very low rpm's. For one thing, the energy efficiency decreases, for another the engine will run unevenly with ensuing risk for stalling. In cases of low power output, the transmission gear ratio should be restricted to prevent the engine rpm from becoming too low, and instead the power output of the engine should be controlled by throttling or decreased fuel supply. At the very lowest actuation of the accelerator, the engine may advantageously be entirely disconnected from the vehicle drive, creating a zero gear ratio.

The accelerator, which provides the driver with a continues range of actuation possibilities from zero to full, thus functions in different ways in different situations so that a driving cycle may have the following appearance:

a. The vehicle is at standstill. The accelerator is at zero (for instance released). The engine is disconnected and runs at idle rpm restricted by throttling or low fuel supply.

b. The accelerator is somewhat actuated (transition to control range low). The engine is now engaged for driving at initially low gear ratio. The vehicle starts moving.

c. The accelerator is actuated a little further (transition from control range low to control range normal). The throttle or the fuel supply is increased to full within a small speed control interval and the gear ratio is increased. The vehicle accelerates moderately. The more the accelerator is actuated the less the gear ratio is increased and the higher rpm and acceleration we get.

d. The accelerator is now positioned within the normal driving range and is thus controlling the transmission gear ratio in such a manner that the ratio decreases when the actuation increases. The engine throttle or fuel supply is at full and the driver controls the vehicle velocity by means of the accelerator which affects the transmission gear ratio. The engine rpm is automatically maintained at lowest possible level as permitted by the power requirement. The vehicle is in the normal driving mode as described above.

e. The driver now wants maximum acceleration and thus actuates the accelerator to maximum. The transmission gear ratio is reduced so that the engine rpm increases up to maximum power but no further. The RPM restriction function as described above is in operation. The vehicle now accelerates at full engine power and increasing transmission gear ratio until its maximum velocity is obtained or the driver reduces the actuation of the accelerator whereby normal operation as described in d. above is resumed.

f. The driver desires to reduce the velocity rapidly and lessens the accelerator actuation into the low velocity interval. Gear ratio and throttling or fuel supply are then reduced with a resulting braking effect that becomes stronger the smaller the actuation of the accelerator is. The braking effect from the engine remains until the vehicle velocity corresponds to the actuation of the accelerator or until the driver increases the actuation and returns to normal operation.

Figure 2:
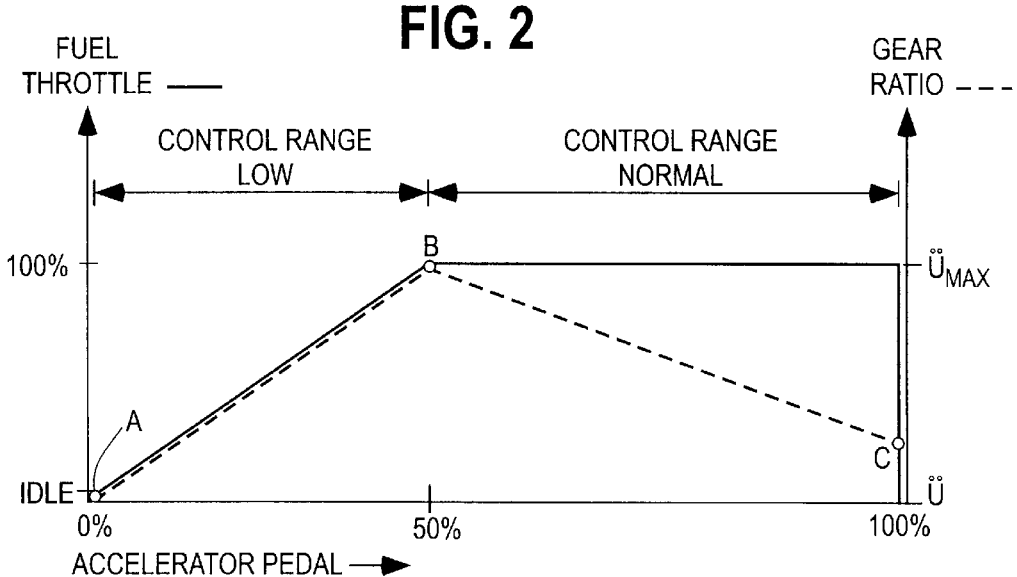
FIG. 2 is a graph of fuel throttle opening and transmission gear ratio plotted as functions of accelerator pedal depression for a control method in accordance with one embodiment of the invention.

Movement through the control modes a, b and c is represented by the graph of FIG. 2. At position A, the vehicle is at rest, the transmission gear ratio at zero (neutral), the throttle at idle and the accelerator pedal at 0%. As the accelerator is pressed, the controller ramps up the fuel throttle and gear ratio; the vehicle accelerates. The exact ramping data is selected to provide a smooth acceleration, given a specific engine's torque and power curves. The control scheme transitions at point B when the accelerator pedal has been actuated a certain percentage, in this example 50%. With the accelerator pedal at 50% or more, the throttle is fixed at 100%, i.e. wide open. Point B is selected by the vehicle designers taking into account the engine characteristics, the expected loads on the vehicle, and the expected traffic environment where the vehicle will spend the majority of its operational time. With all factors accounted for, B is the cruising speed maximum efficiency point for engine operation.

To increase power output, the driver, once up to B, cruising speed, depresses the accelerator pedal further. With a constant throttle, further actuation acts to lower the gear ratio, thereby increasing the engine rpm's. As rpm's increase, the engine moves closer to its less efficient maximum power output level, thereby further increasing velocity and/or acceleration level. The driver controls the vehicle via the engine power output level up to a maximum level C. Beyond C, engine rpm's continue to rise but provide no further gains to engine output power and may even reach a point where the engine becomes damaged. Therefore, an interlock prevents the gear ratio from being lowered, in the full throttle range, to a level where the engine rpm's will exceed the point where maximum power output of the engine occurs.

For moderate changes in speed, the driver uses the accelerator pedal. If sudden breaking is required, the accelerator is released and brakes applied. Brake application overrides the accelerator and automatically returns the throttle and gear ratio to point A. To maintain a smooth ride, the controller may be programmed to estimate the proper point along FIG. 2 to re-engage so that engine braking is avoided, if the brakes are released without first coming to a full stop.

Advantageously a control mechanism which prevents the gear ratio from becoming to low may be used to protect the engine from detrimental excessively high rpm's during braking by means of the engine. In case of moderate requirements on braking capacity this control mechanism may very well be the same that during rapid acceleration prevents the engine rpm from exceeding that which gives the maximum power (cf. paragraph e. above and previous description).

An engine does not change its rpm instantaneously upon a change of load. Kinetic energy is stored in the moving parts of the engine and upon increased load the rpm does not come down to its final value until some of that energy has been spent. Correspondingly the rpm does not increase momentarily upon a reduction in load. First kinetic energy has to be stored in the moving parts. To ensure jerk-free operation it may therefore be advantageous that the changes in gear transmission ratio are not allowed to happen too rapidly in case of sudden changes of the accelerator actuation. Thus, it is advantageous to delay the change in gear ratio so that the time response to accelerator movements are adapted to the dynamic properties of the engine and changes do not take effect to rapidly. Throttling or decrease in fuel supply may however take place immediately upon rapid release of the accelerator into the low velocity range provided. This does not cause difficulties for the engine in use.

A person skilled in the art will have no difficulty to provide a system for implementing the invention and connect an engine with the associated throttle or fuel supply mechanism to a gear box and a velocity controller or accelerator so as to impart to the system the properties described above.

This may be accomplished by entirely mechanical devices such as link arms, rotating shafts, cam discs, motion dampening devices and the like that are connected to the gear box together with a mechanical rotational speed governor. Hydraulic or pneumatic means might also be used.

Advantageously, the control may also be performed by electronic means for instance by a computer adapted or programmed for the purpose. Computer inputs of vehicle speed, gear ratio, engine rpm, and pedal position would allow the computer to determine what mode the vehicle was in and then determine proper gear ratio and throttle settings. If desired, extra safety against uncontrolled racing of the vehicle in case of disturbances or malfunction in the electronics can advantageously be accomplished by the application of a mechanical connection that cuts back the throttle/fuel supply when the accelerator is pulled back or released.

In the description above the invention has been described in connection with a gear box having a continuously variable gear transmission ratio. The invention may however also be used together with a stepped gear box where gear transmission ratio is changed in discrete steps. During normal driving the principle of controlling the vehicle velocity indirectly by changes in transmission gear ratio is then still valid for big changes in velocity. The actuation range of the accelerator is divided into as many intervals as the number of steps in the gear box intended for normal driving. At the upper actuation range of each such interval the engine throttle or fuel supply will be at its maximum. It is then successively reduced towards the lower end of the interval so as to be adapted to full throttle or fuel supply at the higher transmission ratio of the next lower accelerator actuation interval. The engine throttle or fuel supply is thus used for small changes of velocity within each interval.

In this case too it is advantageous that the engine rpm is restricted to values below those where the engine power is at maximum or under engine braking conditions below detrimental values. Also it is advantageous to use low gear ratios and velocity control by throttle or fuel supply within a special low speed interval of the accelerator.

Both in the case of continuously variable gear box and the case of stepped gear box it is possible to connect the accelerator mechanism to an automatic cruise control either in the form of a separate unit or incorporated into the control system.

In the description above the terms maximum throttle or fuel supply have been used to describe the maximum for which the engine is designed to operate under normal conditions. For environmental reasons or for reasons of wear or other reason this may be below the absolute maximum (overload). Such an overload situation is then avoided under normal driving. The accelerator of the vehicle may then be designed so that when fully actuated, it also increases throttle or fuel supply to this maximum so that the engine power can be utilized to its absolute maximum. In some cases, for instance for environmental reasons, it may be advantageous to make the maximum throttle or fuel supply variable. It may be determined by some internal factor such as engine rpm, or, by means of a control, external circumstances such as whether the vehicle is used in urban traffic or in the countryside. It may also be determined by the quality of fuel that is used and so on.

What is claimed is:

1. A method for operating a vehicle having an engine, an accelerator pedal, a fuel supply control, and a continuously variable gear ratio transmission comprising the steps of:

during a first range of pedal movement, partially manipulating the accelerator pedal between a no actuation position and an intermediately actuated position, said pedal manipulation corresponding to a gradual increase in the transmission gear ratio from zero up to a predetermined maximum ratio, and wherein the fuel supply control varies between an idling and a fully opened position; and during a second range of pedal movement, maintaining the fuel supply control at a fully opened and substantially constant valve position, and manipulating the accelerator pedal from the intermediately actuated position towards the fully actuated position, wherein the transmission gear ratio gradually decreases according to an increased manipulation of the accelerator pedal, whereby acceleration and higher vehicle traveling speeds may be obtained.

2. The method according to claim 1, wherein the transmission gear ratio is automatically controlled so that an engine rotational speed does not exceed a speed where the engine has maximum power output.

3. The method according to claim 1, wherein the transmission gear ratio is automatically controlled so that an engine rotational speed under a braking condition does not exceed maximum safe engine speed for the engine.

4. The method of claim 1, wherein during the second control phase, the fuel supply control can be increased further to gain access to an overload power when the accelerator pedal is actuated to a substantially fully actuated position.

* * * * *